(12) United States Patent
Radisch

(10) Patent No.: US 7,793,508 B2
(45) Date of Patent: Sep. 14, 2010

(54) MODULAR REFRIGERATED DRYER APPARATUS AND METHOD

(75) Inventor: Ingo K. Radisch, Sonsbeck (DE)

(73) Assignee: Flair Corporation, Ocala, FL (US)

( * ) Notice: Subject to any disclaimer, the term of this patent is extended or adjusted under 35 U.S.C. 154(b) by 1267 days.

(21) Appl. No.: 11/266,595

(22) Filed: Nov. 4, 2005

(65) Prior Publication Data
US 2006/0107669 A1      May 25, 2006

Related U.S. Application Data

(60) Provisional application No. 60/625,171, filed on Nov. 5, 2004.

(51) Int. Cl.
*F25D 21/00* (2006.01)
(52) U.S. Cl. .......................... 62/150; 62/272; 236/44 A
(58) Field of Classification Search .................. 62/93, 62/272, 150; 326/44 A
See application file for complete search history.

(56) References Cited

U.S. PATENT DOCUMENTS

| 2,867,988 | A | * | 1/1959 | Brandt | 62/93 |
| RE26,612 | E | * | 6/1969 | Mole | 62/3.2 |
| 3,750,415 | A | * | 8/1973 | Peuchen et al. | 62/93 |
| 3,795,986 | A | * | 3/1974 | Sutherland et al. | 34/92 |
| 4,486,960 | A | * | 12/1984 | Maurice et al. | 34/64 |
| 4,941,894 | A | * | 7/1990 | Black | 95/14 |
| 5,865,035 | A | * | 2/1999 | Kojima et al. | 62/236 |
| 6,508,066 | B1 | * | 1/2003 | Mierins et al. | 62/97 |
| 2002/0056288 | A1 | * | 5/2002 | Kim et al. | 62/476 |
| 2003/0167779 | A1 | * | 9/2003 | Steiner | 62/93 |
| 2005/0229748 | A1 | * | 10/2005 | Bleifuss et al. | 75/483 |

* cited by examiner

Primary Examiner—William E Tapolcai
(74) Attorney, Agent, or Firm—Baker & Hostetler LLP

(57) ABSTRACT

The modular arrangement of refrigerated dryers is achieved by combining refrigerated dryers in groups to produce a combined refrigerator dryer capacity. A common air inlet and/or common air outlet for the dryer is provided, along with a common controller. A cabinet to house the dryers may also be provided.

34 Claims, 7 Drawing Sheets

MODULAR REFRIGERATED DRYER APPARATUS AND METHOD

CROSS-REFERENCE TO RELATED APPLICATIONS

This application claims priority to U.S. Provisional Patent Application entitled, MODULAR REFRIGERATED DRYER APPARATUS AND METHOD, filed Nov. 5, 2004, having a Ser. No. 60/625,171, the disclosure of which is hereby incorporated by reference in its entirety.

FIELD OF THE INVENTION

The present invention relates generally to gas treatment. More particularly, the present invention relates to apparatus and methods related to refrigerated dryers.

BACKGROUND OF THE INVENTION

Refrigerated dryers are in wide use in industry to treat compressed gases such as air. Compressed air dryers reduce the quantity of water vapor, liquid water, hydrocarbon, and hydrocarbon vapor in compressed air because moisture in compressed air is harmful. Water damages a compressed air system in several ways: erosion, corrosion, microbial contamination and freezing. Erosion is caused by water mist eroding piping, valves and other system components. Corrosion is caused by mist when it condenses and combines with salts and acids within the system to form highly corrosive solutions. Microbial contamination is caused when moisture supplies a growth medium for bacteria and mold, which produce acidic waste and can be a health threat, especially in food related applications. Finally, when water freezes in compressed air lines, this can lead to shutting down of the entire system, which results in tremendous loss of productivity. Drying wet compressed air minimizes these harmful effects.

Compressed air is dried to protect the system's piping and process equipment. Dry air also protects against lost product. Most pneumatic equipment have a recommended operating pressure, dryness level, and a maximum operating temperature.

Refrigerated air dryers utilize a mechanical refrigeration system to cool the compressed air and condense water and hydrocarbon vapor. Most refrigerated air dryers cool the compressed air to a temperature of approximately 35 degrees to 50 degrees Fahrenheit which results in a pressure dew point range of 33 degrees to 39 degrees Fahrenheit. This range permits the pressure dew point to fall within limits that are achievable with common refrigeration system controls. Refrigerated air dryers are available in two basic configurations, non-cycling and cycling.

There are many uses for compressed air that require a reduction in the vaporous contaminants as well as the elimination of all liquids. Typical conventional refrigerated air dryers pass the compressed air through a refrigerant-to-compressed air heat exchanger where the compressed air is cooled, condensing condensable material contained in the air stream. A separator then removes the condensate and the compressed air continues on to its end application. The unit of measure for capacity related to a refrigerated dryer is standard cubic feet per minute, (SCFM) referenced to a specific pressure, temperature and relative humidity. Typically, SCFM is referenced to 14.7 PSIA, 68 degrees Fahrenheit and 0% relative humidity.

Conventionally, the engineer selects from a variety of heat exchangers, condensing units, separators and other components to determine which configuration is best for a particular capacity refrigerated dryer. This is disadvantageous in that there is greater lead time due to the engineering involved in designing each refrigerated dryer per its particular requirement. Also, each of the components must then be specifically manufactured, which leads to increased cost.

While the foregoing systems are useful, improvements are still desirable. For example, the existing systems may require a great deal of engineering. For each type of need or size requirement, research may need to be conducted to determine which capacity of refrigerated dryer is required and what type of components are required to fulfill that need. Moreover, the various components need to be manufactured, which sometimes takes a considerable amount of time.

It is therefore desirable to have the ability to service the user efficiently, meeting the user's needs in a timely, yet cost effective manner. It is beneficial that when large usage needs are present, a great deal of time need not be spent on designing a specially sized refrigerated dryer to fit the needs of that customer. Accordingly, it is desirable to provide a method and apparatus that increases capacity of refrigerated dryers in a highly efficient manner.

SUMMARY OF THE INVENTION

The foregoing needs are met, to a great extent, by the present invention, wherein in one aspect an apparatus and method are provided that in some embodiments combine two or more refrigerated dryers to produce a much higher capacity combined refrigerated dryer.

In accordance with an embodiment of the present invention, a refrigerated dryer apparatus includes a plurality of refrigerated dryers, each dryer having a respective gas inlet and gas outlet, and a main air inlet connected to each of the respective gas inlets.

In accordance with another embodiment of the invention, a refrigerated dryer apparatus includes a plurality of refrigerated dryers, each dryer having a respective gas inlet and gas outlet, and a main gas outlet connected to each of the respective gas outlets.

In accordance with another embodiment of the invention, a refrigerated dryer apparatus includes a plurality of refrigerated dryers, each dryer having a respective gas inlet and gas outlet, a main air inlet connected to each of the respective gas inlets, a main air outlet connected to each of the respective gas outlets, and a common controller that controls the operation of all of the plurality of refrigerated dryers.

In accordance with another embodiment of the invention, a method of increasing the capacity of a refrigerated dryer includes providing a first refrigerated dryer having a first heat exchanger, a first condensing unit, a first air inlet and a first air outlet, providing a second refrigerated dryer having a second heat exchanger, a second condensing unit, a second air inlet and a second air outlet, coupling the first and second heat exchangers, coupling the first and second condensing units, coupling the first and second air inlets, and coupling the first and second air outlets.

In accordance with another embodiment of the invention, a system for increasing the capacity of a refrigerated dryer includes a first refrigerated dryer means, wherein the first refrigerated dryer means includes a first heat exchanging means, a first condensing means, a first air inlet means and a first air outlet means, a second refrigerated dryer means wherein the second refrigerated dryer means includes a second heat exchanging means, a second condensing means, a second air inlet means and a second air outlet means a means for coupling the first and second heat exchanging means, a means for coupling the first and second condensing means, a means for coupling the first and second air inlet means, and a means for coupling the first and second air outlet means.

There has thus been outlined, rather broadly, certain embodiments of the invention in order that the detailed description herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
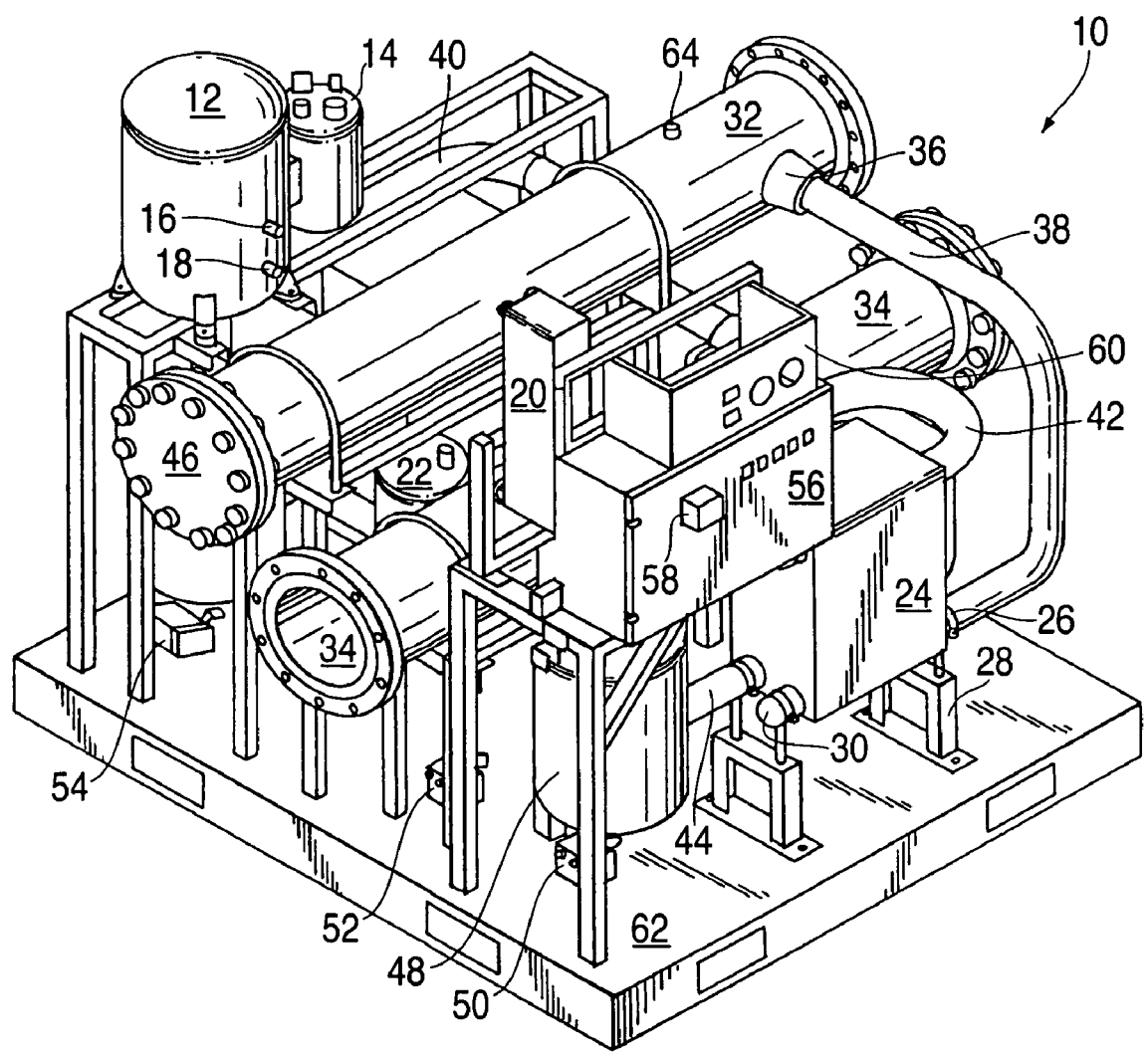
FIG. 1 is an illustration of a refrigerated dryer.

An embodiment in accordance with the present invention provides a modular refrigerated dryer. Some embodiments of the present invention relates to a modularized system for drying and cleaning compressed gas, such as air, whereby one can easily increase capacity of the refrigerated dryers. Such ease greatly reduces cost, allows for low inventories and maximizes efficiency. Preferred embodiments of the invention will now be described with reference to the drawing figures, in which like reference numerals refer to like parts throughout.

FIG. 1 is an illustration of a refrigerated dryer 10. In an embodiment of the present invention, the refrigerated dryer 10 has a refrigeration compressor 12, a refrigeration heat exchanger 14, a refrigeration outlet 16 and a refrigeration inlet 18. Further, the refrigerated dryer 10 includes a water cooled refrigeration heat exchanger 20, along with a refrigeration receiver tank 22. There is also a plate heat exchanger 24. The plate heat exchanger 24 includes a port plug 30 and is mounted to the refrigerated dryer 10 by way of a mounting clamp 26 and a mounting bracket 28.

Further, the refrigerated dryer 10 includes a compressed air outlet 32, a compressed air inlet 34 and various manners of pipes and conduits 36, 38, 40, 42, and 44. There is also a blind flange 46 and a sensor port 64.

Moreover, the refrigerated dryer 10 includes a condensate separator assembly 48 and various condensate drains 50, 52, and 54. Finally, a controller 56 is used to manage the operations of the refrigerated dryer 10. The controller 56 has a main disconnect switch 58 and a visual display 60. A base pan 28 may form the floor of the refrigerated dryer 10. The refrigerated dryer 10 may be coupled to a housing (not shown).

In operation, compressed air enters the refrigerated dryer 10 at the compressed air inlet 34. With the interconnected air piping 38, the compressed air reaches the plate heat exchanger 24. First, the pre-cooling of the inlet air flow occurs using the air/air plate heat exchanger 24 with the cold outlet compressed air flow. Next, the cooling is effected by evaporation refrigerant in the plate heat exchanger 24. The cooling temperature is approximately +3° C. The condensate separator assembly 48 separates the condensed water drops as well as oil and particulate particles from the compressed air stream. Condensate is drained via the condensate drains 50, 52 and 54.

After warming up in the air/air plate heat exchanger 24, the compressed air leaves the refrigerated dryer 10 dry and warm with a temperature of approximately 8 K less than the inlet temperature. Backflow stream flows in opposite to the newly arriving compressed air flow, which is cooled as described above.

The refrigeration circuit is hermetically sealed. The refrigeration compressor 12 takes in evaporated refrigerant and compresses it to a higher pressure. In the water cooled refrigeration heat exchanger 20, the compressed refrigerant is being liquefied by cooling water. Via an injection instrument, the liquid refrigerant is reduced in pressure and injected into the refrigerant/air plate heat exchanger 24. The hot-gas bypass regulator regulates automatically the required cooling capacity in the heat exchanger portion.

The visual display 60 presents information such as the temperature of the compressed air inlet 34 measured by the sensor port 64. Further, additional information such as, but not limited to, outlet pressure and dew point are shown. Power may be turned on or off using the main disconnect switch 58. The control box 56 may contain the wiring and the electronic control board.

Figure 2:
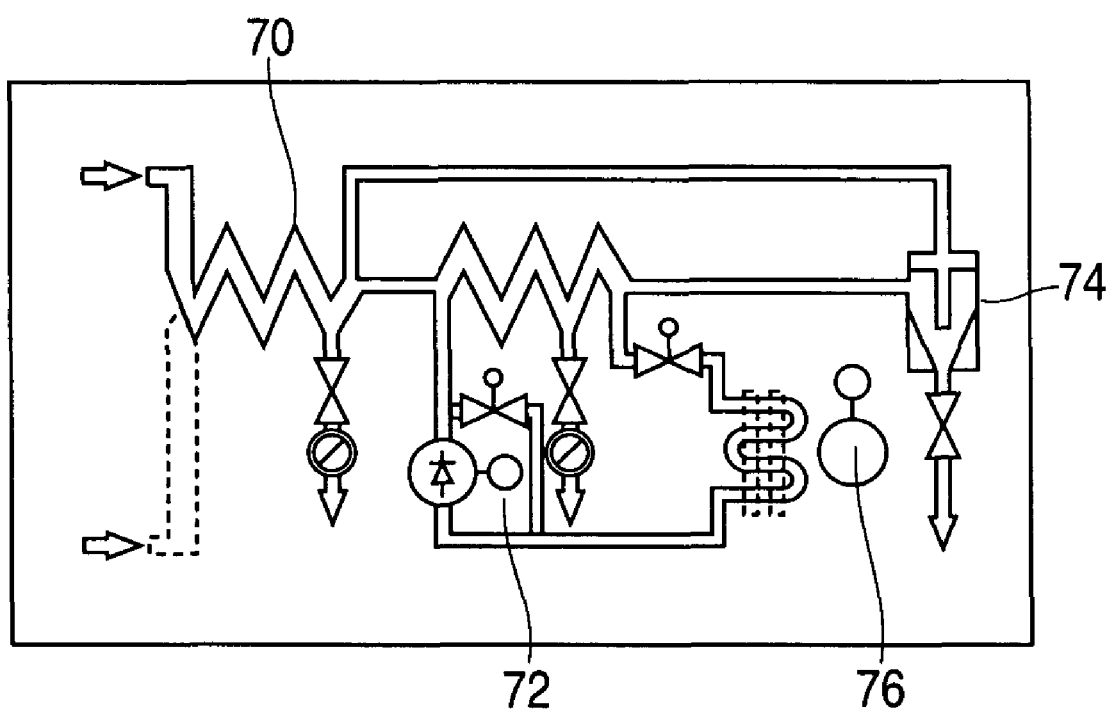
FIG. 2 is a schematic representation of a refrigerated dryer.

FIG. 2 is a schematic illustration of a typical refrigerated dryer 10 with heat exchangers 70, condensing units 72, separators 74 and other components 76. For the sake of simplicity, reference to the remaining FIGS. 3-10 will be made with respect to FIG. 2. The separators 74 collect condensate. Other components 76 can include expansion valves that are useful in refrigerated dryers. In some embodiments, the invention provides for combining several essentially identical modular dryer units, in some cases enclosed in a single cabinet with a main air inlet, a main air outlet, inlet and/or outlet air manifolds and a main controller, thus permitting assembly of a large capacity refrigerated dryer in a short amount of time.

Figure 3:
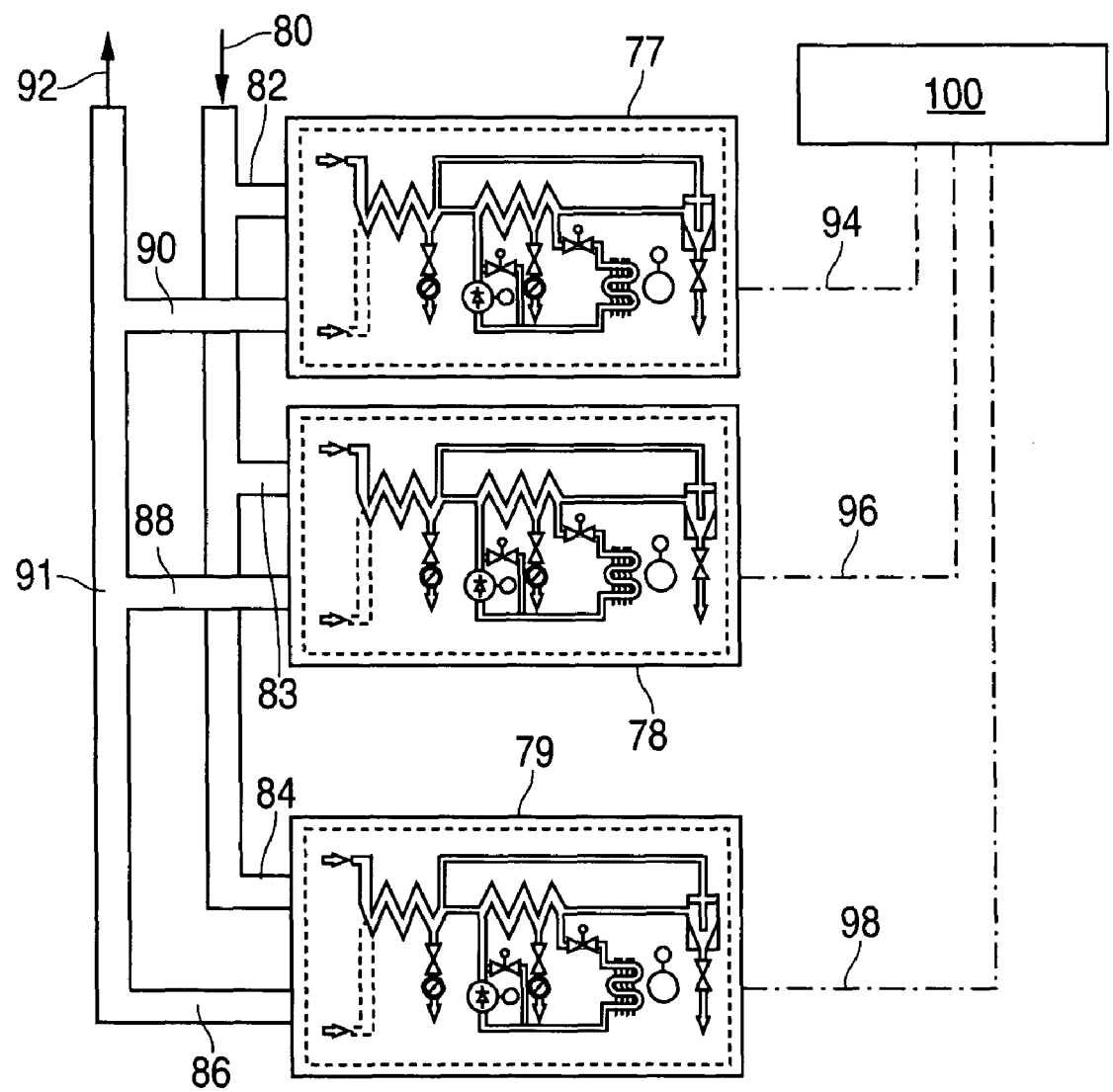
FIG. 3 is a schematic illustration of a parallel configuration of the modular refrigerated dryer having three dryer units in a parallel configuration.

FIG. 3 is a schematic illustration showing the modular arrangement of on one of the embodiments of this invention. Individual refrigerated dryer units 77, 78 and 79 are configured in a parallel configuration. A main air inlet 80 leads to a manifold 81 that divides off into lines 82, 83, 84 which are the individual air inlets to refrigerated dryer units 77, 78 and 79, respectively.

Individual air outlets 86, 88 and 90 extending from refrigerated dryer units 79, 78, and 77 respectively, all combine into a manifold 91 leading to a main air outlet 92. A controller 100 controls the refrigerated dryer units 77, 78, 79 by way of wires 94, 96, and 98, respectively, connected to the refrigerated dryers. The controller 100 can be any computer device, programmable logic controller or any other controlling device capable of controlling the different machines.

Figure 4:
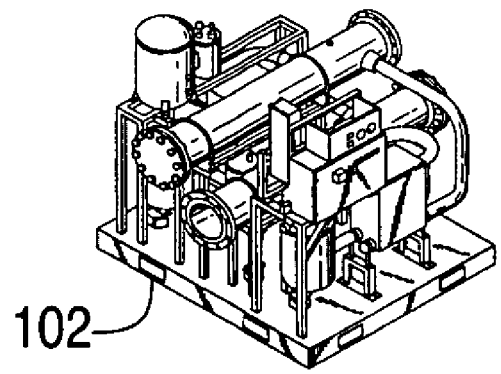
FIG. 4 is a perspective view of one refrigerated dryer unit.
Figure 5:
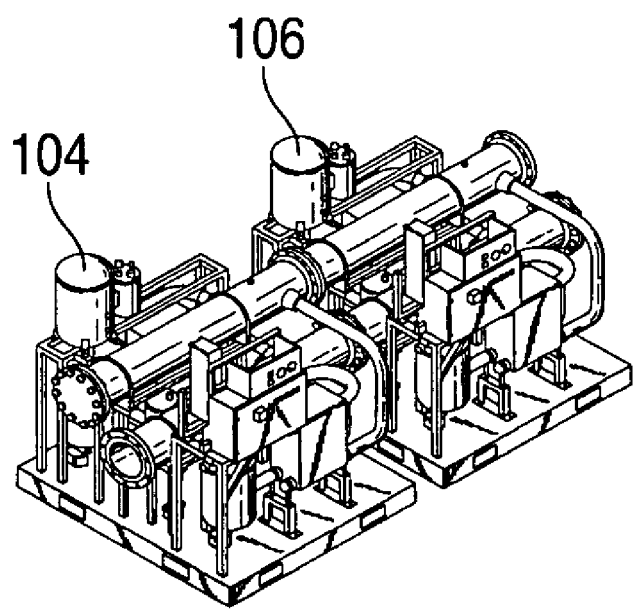
FIG. 5 is a perspective view of two refrigerated dryer units in a parallel configuration.
Figure 6:
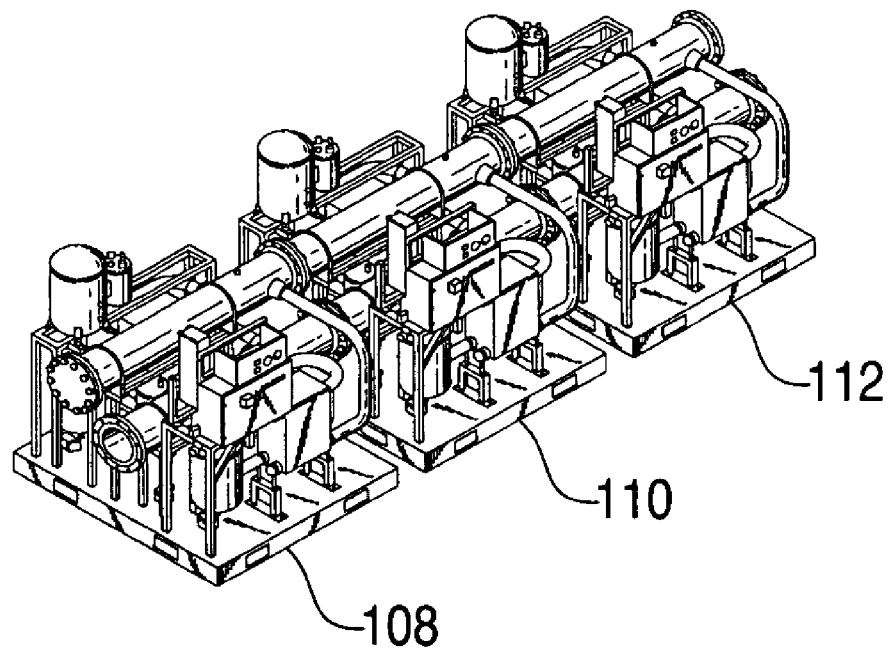
FIG. 6 is a perspective view of three refrigerated dryer units in a parallel configuration.
Figure 7:
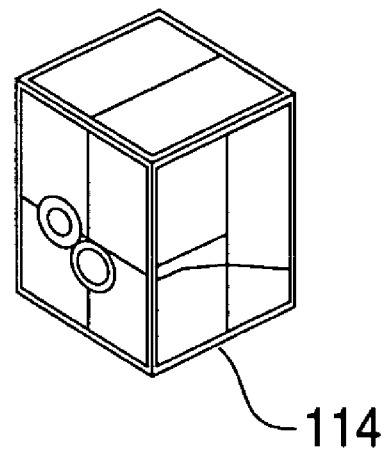
FIG. 7 is a perspective view of a refrigerated dryer enclosed in a cabinet.
Figure 8:
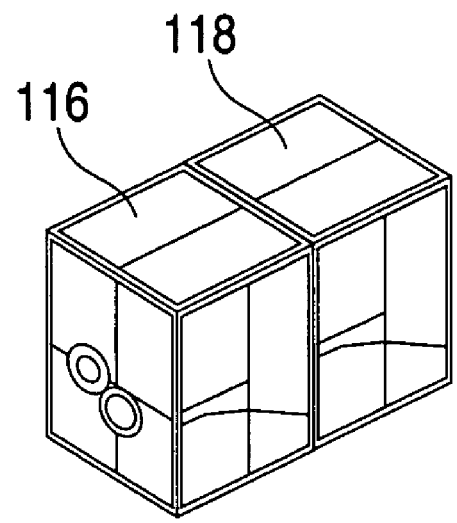
FIG. 8 is a perspective view of two refrigerated dryer units enclosed in respective cabinets.
Figure 9:
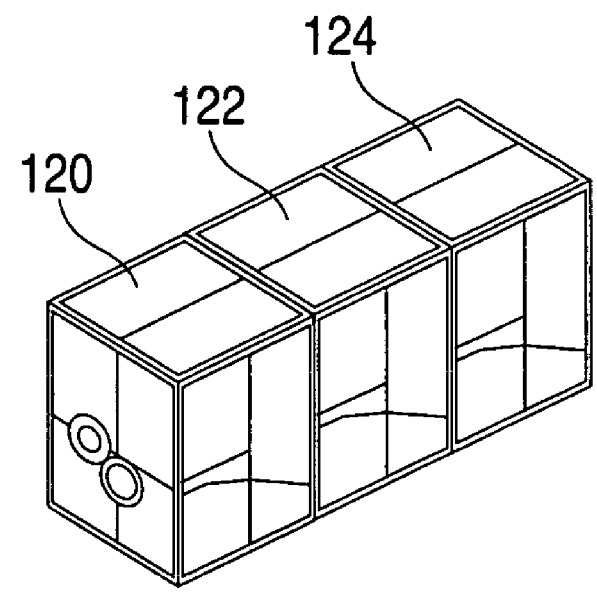
FIG. 9 is a perspective view of three refrigerated dryer units enclosed in respective cabinets.

FIG. 4 is a perspective view of one refrigerated dryer 102. FIG. 5 is a perspective view of two refrigerated dryers 104 and 106 set in a parallel configuration. FIG. 6 shows another embodiment of this invention where three refrigerated dryer units 108, 110, and 112 are set in a parallel configuration. FIG. 7 shows a single refrigerated dryer enclosed inside a cabinet 114. FIG. 8 depicts two refrigerated dryer units 116 and 118 in a parallel configuration also enclosed inside respective cabinets. FIG. 9 illustrates another embodiment of this invention where there are three refrigerated dryer units 120, 122 and 124 set in a parallel configuration shown enclosed in respective cabinets.

Figure 10:
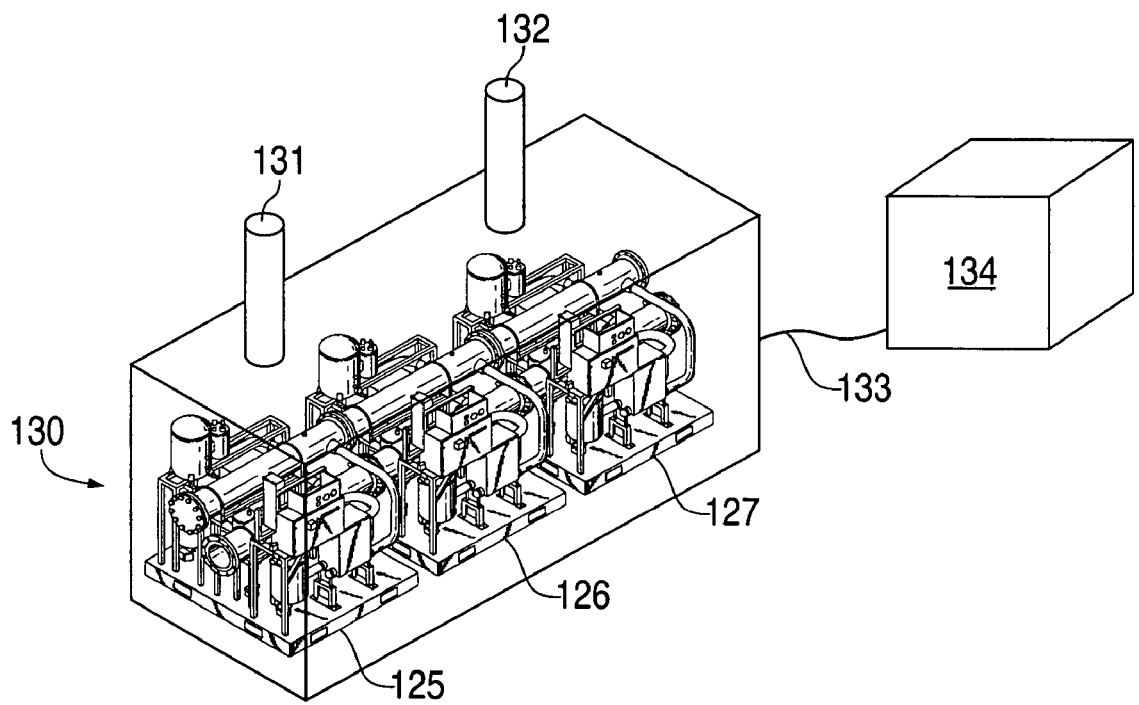
FIG. 10 is a perspective view of three refrigerated dryer units enclosed in a single cabinet, operated by a controller.

FIG. 10 depicts yet another embodiment of this invention whereby, three refrigerated dryer units 125, 126 and 127 are enclosed in a single cabinet 130. The user sees the main air inlet 131 and the main air outlet 132. Wire 133 connects the respective cabinet wires to the controller 134. Thus, the end user only sees one cabinet, one air inlet, one air outlet, and one controller, servicing this group of refrigerated dryer units.

In one example, the modular refrigerated dryer of FIG. 5, with two refrigerated dryers, has twice the capacity of a single refrigerated dryer in FIG. 4. In another example, the modular refrigerated dryer of FIG. 6 with three refrigerated dryers may have triple the capacity of the refrigerated dryer in FIG. 4. The modular refrigerated dryer of FIG. 8 with two refrigerated dryers may have twice the refrigerated capacity of the single refrigerated dryer in FIG. 7. The modular refrigerated dryer of FIG. 9 with three refrigerated dryers may have three times the capacity of the single refrigerated dryer depicted in FIG. 5. Although an example of the modular refrigerated dryer is enclosed in the cabinetry it will be appreciated that the cabinets need not be used.

Furthermore, the above examples assume that the individual refrigerated dryers have identical capacities. However, it will be appreciated that the refrigerated dryers may have any variation of capacities and the combined capacities of the modular refrigerated dryer need not be an exact multiple of the capacity of a single refrigerated dryer unit.

Although FIGS. 5, 6, 8 and 9 show the refrigerated dryer as a parallel configuration it will be appreciated that any type of configuration may be used to achieve the same results.

It will be appreciated that, in some embodiments, the present invention relates to a modularized system for drying and cleaning compressed air, whereby one can easily increase capacity of the refrigerated dryers. Such ease greatly reduces cost, allows for low inventories and maximizes efficiency.

In a preferred embodiment, the refrigerated dryers are placed in parallel with each of the refrigerated dryer's air inlet and air outlet leading to one main air inlet and air outlet extending into and from the cabinet, respectively as in FIG. 10. The individual refrigerated dryers are wired into one main controller outside the cabinet that operates the refrigerated dryers in conjunction.

Various embodiments of the present invention provide a method and apparatus that can easily accommodate increased refrigerated dryer capacity by grouping several pre-existing refrigerated dryers relative to each other to produce the capacity of the combination thereof. This eliminates having to specifically design each refrigerated dryer to accommodate one capacity requirement, which may greatly reduce cost and lead time. Therefore, it is possible to have just a few sizes of refrigerated dryers in the inventory and combine them in an appropriate manner to achieve desired capacities.

In one example, two 1250 SCFM refrigerated dryers may be combined to form one 2500 SCFM refrigerated dryer. In another example, one 1250 SCFM refrigerated dryer may be combined with a 2500 SCFM refrigerated dryer to produce a modular refrigerated dryer with the cumulative capacity of 3750 SCFM.

An additional benefit is achieved during maintenance and repair. It is easier to repair or replace any element of the refrigerated dryer because components of the refrigerated dryer may be identical among the group of refrigerated dryers. This also greatly reduces downtime. Further, the manufacturer can have a greater inventory of replacement parts that can be used quickly, speeding up the repair process, making it easier to order and obtain replacement parts, greatly increasing efficiency.

In accordance with another embodiment of the present invention, a method for increasing the capacity of a refrigerated dryer includes arranging the refrigerated dryers relative to one another, combining the individual air inlets and air outlets into one main air inlet and outlet, respectively, outside the cabinet and wiring the individual refrigerated dryers to one computer controller that controls the activities of the refrigerated dryers.

In accordance with yet another embodiment of the present invention, a method for increasing the capacity of the refrigerated dryers includes grouping several refrigerated dryers relative to one another or in a parallel configuration and coupling the individual refrigerated dryers' air inlets and air outlets to the main air inlet and air outlet, respectively, of a cabinet, and wiring the refrigerated dryers to one controller that controls the refrigerated dryers.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A refrigerated dryer apparatus, comprising:
   a plurality of refrigerated dryer modules to rearrange, replace, combine, and interchange easily, each dryer module having a respective gas inlet and gas outlet;
   a main air inlet connected to each of the respective gas inlets; and
   a common controller that controls all of the refrigerated dryer modules.

2. The apparatus according to claim 1, further comprising an inlet manifold connecting the main gas inlet to the respective gas inlets.

3. The apparatus of claim 2, further comprising a main gas outlet connected to each of the respective gas outlets.

4. The apparatus of claim 3, further comprising an outlet manifold connecting the main gas outlet to the respective gas outlets.

5. The apparatus of claim 2, further comprising a cabinet that houses the plurality of refrigerated dryers.

6. The apparatus of claim 1, further comprising a main gas outlet connected to each of the respective gas outlets.

7. The apparatus of claim 6, further comprising a cabinet that houses the plurality of refrigerated dryers.

8. The apparatus of claim 7, wherein the cabinet further houses the inlet manifold and the outlet manifold.

9. The apparatus of claim 1, wherein the gas is air.

10. The apparatus of claim 1, further comprising a plurality of cabinets that house the plurality of refrigerated dryers.

11. The apparatus of claim 1, wherein each of the plurality of refrigerated dryers has a capacity size.

12. The apparatus of claim 11, wherein the capacity size of each of the plurality of refrigerated dryers is identical.

13. The apparatus of claim 11, wherein the capacity size of each of the plurality of refrigerated dryers varies.

14. A refrigerated dryer apparatus, comprising:
a plurality of refrigerated dryer modules to rearrange, replace, combine, and interchange easily, each dryer module having a respective gas inlet and gas outlet;
a main gas outlet connected to each of the respective gas outlets; and
a common controller that controls all the refrigerated dryer modules.

15. The apparatus according to claim 14, further comprising an outlet manifold connecting the main gas outlet to the respective gas outlet.

16. The apparatus of claim 15, further comprising a main gas inlet connected to each of the respective gas inlets.

17. The apparatus of claim 14, further comprising a main gas inlet connected to each of the respective gas inlets.

18. The apparatus of claim 14, further comprising a cabinet that houses the plurality of refrigerated dryers.

19. The apparatus of claim 15, further comprising a cabinet that houses the plurality of refrigerated dryers.

20. The apparatus of claim 19, wherein the cabinet further houses an inlet manifold and the outlet manifold.

21. The apparatus of claim 14, wherein the gas is air.

22. The apparatus of claim 14, further comprising a plurality of cabinets that house the plurality of refrigerated dryers.

23. The apparatus of claim 14, wherein each of the plurality of refrigerated dryers has a capacity size.

24. The apparatus of claim 23, wherein the capacity size of each of the plurality of refrigerated dryers is identical.

25. The apparatus of claim 23, wherein the capacity size of each of the plurality of refrigerated dryers varies.

26. A refrigerated dryer apparatus, comprising:
a plurality of refrigerated dryer modules to rearrange, replace, combine, and interchange easily, each dryer module having a respective gas inlet and gas outlet;
a main air inlet connected to each of the respective gas inlets;
a main air outlet connected to each of the respective gas outlets; and
a common controller that controls the operation of all of the plurality of refrigerated dryer modules.

27. The apparatus of claim 26, where the gas is air.

28. The apparatus of claim 26, further comprising a cabinet that houses the plurality of refrigerated dryers.

29. The apparatus of claim 26, further comprising an outlet manifold connecting the main gas outlet to the respective gas outlets and an inlet manifold connecting the main gas inlet to the respective gas inlets.

30. The apparatus of claim 29, wherein the cabinet further houses the inlet manifold and the outlet manifold.

31. The apparatus of claim 26, further comprising a plurality of cabinets that house the plurality of refrigerated dryers.

32. The apparatus of claim 26, wherein each of the plurality of refrigerated dryers has a capacity size.

33. The apparatus of claim 29, wherein the capacity size of each of the plurality of refrigerated dryers is identical.

34. The apparatus of claim 29, wherein the capacity size of each of the plurality of refrigerated dryers varies.

* * * * *